United States Patent
Bertrand et al.

(10) Patent No.: US 8,714,447 B1
(45) Date of Patent: May 6, 2014

(54) IDENTIFYING AND CORRECTING INVALID IDENTIFIERS

(75) Inventors: Michael J. Bertrand, Los Gatos, CA (US); William T. Laaser, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 125 days.

(21) Appl. No.: 13/353,821

(22) Filed: Jan. 19, 2012

(51) Int. Cl.
*G06K 5/00* (2006.01)

(52) U.S. Cl.
USPC .......................................... 235/380; 235/382

(58) Field of Classification Search
USPC .................... 235/380, 382, 487, 492
See application file for complete search history.

(56) References Cited

U.S. PATENT DOCUMENTS

| | | | | |
|---|---|---|---|---|
| 6,041,324 | A * | 3/2000 | Earl et al. | 1/1 |
| 7,925,866 | B2 * | 4/2011 | Greenhalgh et al. | 712/213 |
| 2003/0149567 | A1 * | 8/2003 | Schmitz et al. | 704/270 |

\* cited by examiner

*Primary Examiner* — Daniel St Cyr
(74) *Attorney, Agent, or Firm* — Park, Vaughan, Fleming & Dowler LLP; Steven E. Stupp

(57) ABSTRACT

During a correction technique, a computer system determines that an identifier for an individual received from a source is invalid based on a technique used to generate identifiers for individuals. In response, the computer system calculates one or more possible correct identifiers and associated confidence values based on the identifier and the source. Then, the computer system selects at least one of the possible correct identifiers as the correct identifier.

22 Claims, 5 Drawing Sheets

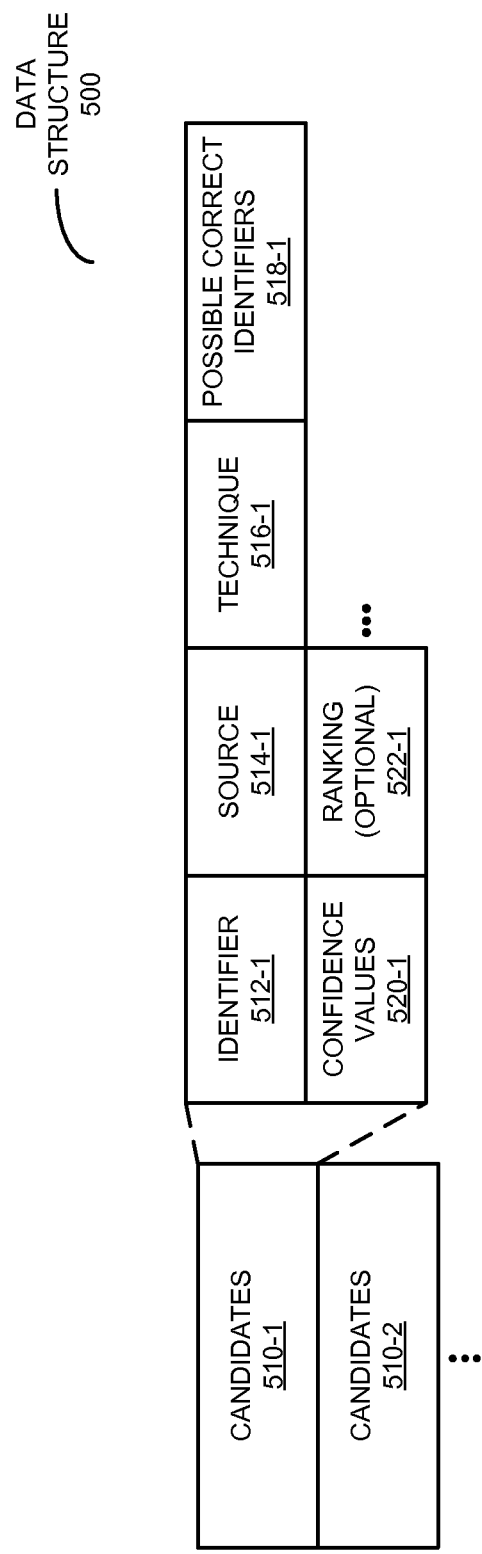

IDENTIFYING AND CORRECTING INVALID IDENTIFIERS

BACKGROUND

The present disclosure relates to techniques for identifying and correcting errors in identifiers. More specifically, the present disclosure relates to a technique that determines whether an identifier for an individual is invalid based on an identifier-generating technique, and if the identifier is invalid, calculates and selects a correct identifier.

Many financial transactions are conducted using financial instruments, such as credit cards and debit cards. Credit cards and debit cards typically include account numbers (which are henceforth referred to as 'identifiers'), such as credit-card numbers and debit-card numbers. During a financial transaction, a consumer usually provides a credit card or a debit card to a merchant, who obtains the identifier either by swiping the card through a magnetic card reader, or by manually typing in the identifier using a keyboard.

However, such techniques for obtaining identifiers from credit cards and debit cards (and, more generally, financial instruments) are prone to errors. As a consequence, the identifiers provided by a magnetic card reader or a keyboard may be incorrect, which may disrupt a financial transaction and forces merchants to obtain the identifiers again. This approach is time-consuming and can be frustrating for the consumers and the merchants.

SUMMARY

The disclosed embodiments relate to a computer system that determines a correct identifier for an individual. During operation, the computer system receives an identifier for the individual from a source. Upon determining that the identifier is an invalid identifier based on a technique used to generate identifiers for individuals, the computer system calculates one or more possible correct identifiers and associated confidence values based on the identifier and the source. Then, the computer system selects at least one of the possible correct identifiers as the correct identifier.

Note that at least some or all of the possible correct identifiers may have confidence values associated with them. Therefore, the computer system may provide the multiple possible correct identifiers and the associated confidence values to the individual. Then, the computer system may receive an instruction from the individual identifying the correct identifier. Alternatively, the computer system may: rank the multiple possible correct identifiers based on the associated confidence values; provide the ranked multiple possible correct identifiers to the individual; and receive an instruction from the individual identifying the correct identifier.

In some embodiments, the computer system completes a financial transaction using the correct identifier.

Furthermore, prior to the selecting, the computer system may test the possible correct identifiers to determine if any of the possible correct identifiers are valid identifiers.

The identifier may include: a credit-card number, a debit-card number, a national identification-card number, a national provider identifier number, and/or a Social Security number. Moreover, the source may include: an image sensor, a scanner, a natural-language processing technique, a card reader, an optical-character-recognition engine, a mechanical reader, and/or a keypad.

Furthermore, the operations performed by the computer system may facilitate correction of errors in the identifier.

Additionally, the technique may produce a checksum.

Note that the one or more possible correct identifiers may be calculated based on the technique.

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

FIG. 5 is a block diagram illustrating a data structure for use with the computer system of FIG. 4 in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for determining a correct identifier for an individual, and a computer-program product (e.g., software) for use with the computer system are described. During this correction technique, the computer system determines that an identifier for an individual received from a source is invalid based on a technique used to generate identifiers for individuals. In response, the computer system calculates one or more possible correct identifiers and associated confidence values based on the identifier and the source. Then, the computer system selects at least one of the possible correct identifiers as the correct identifier.

By determining the correct identifier for the individual, the correction technique may address the errors that can occur when identifiers are obtained from financial instruments, such as credit cards and debit cards. As a consequence, the correction technique may reduce the need for merchants to obtain the identifiers again (for example, by re-swiping a credit card or a debit card through a magnetic card reader), thereby decreasing the inconvenience for individuals and the merchants. In this way, the correction technique may promote commercial activity.

In the discussion that follows, a user may include: an individual (for example, an existing customer, a new customer, a service provider, a vendor, a contractor, etc.), an organization, a business (such as a merchant) and/or a government agency. Furthermore, a 'business' should be understood to include: for-profit corporations, non-profit corporations, organizations, groups of individuals, sole proprietorships, government agencies, partnerships, etc.

Figure 1:
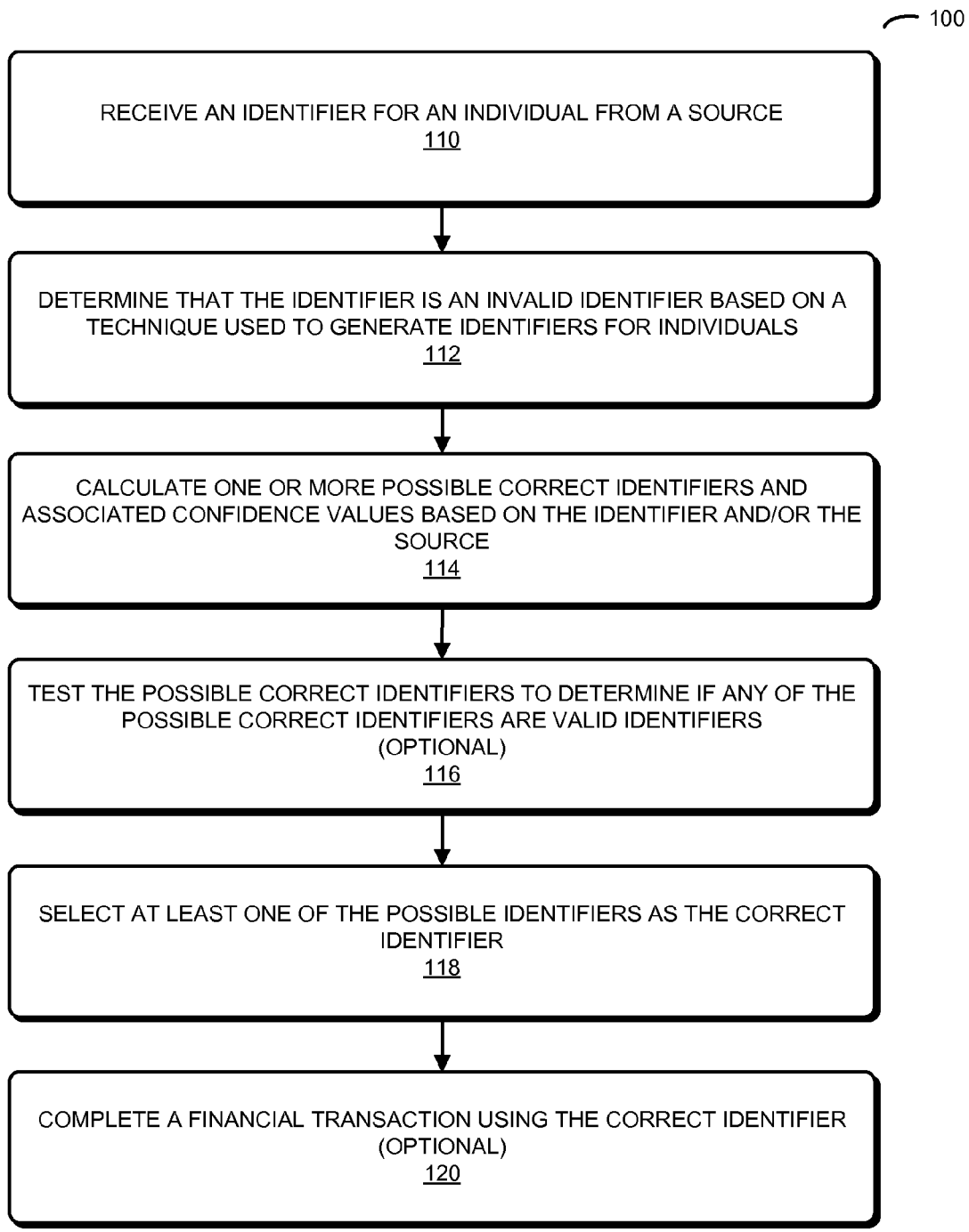
FIG. 1 is a flow chart illustrating a method for determining a correct identifier for an individual in accordance with an embodiment of the present disclosure.

We now describe embodiments of the correction technique, which may be performed by a system (such as system 300 in FIG. 3) and/or a computer system (such as computer system 400 in FIG. 4) in this system. FIG. 1 presents a flow chart illustrating a method 100 for determining a correct identifier for an individual. During operation, the computer system receives an identifier for the individual from a source (operation 110). For example, the identifier may include: a credit-card number, a debit-card number, a national identification-card number, a national provider identifier number, and/or a Social Security number (such as a U.S. Social Security number or a Canadian Social Insurance number). Moreover, the source may include: an image sensor, a scanner, a natural-language processing technique (such as a dictation technique or a speech-to-text engine), a card reader, an optical-character-recognition engine, a mechanical reader, and/or a keypad.

Upon determining that the identifier is an invalid identifier based on a technique used to generate identifiers for individuals (operation 112), the computer system calculates one or more possible correct identifiers and associated confidence values based on the identifier and (possibly) the source (operation 114). For example, the technique may produce a checksum. Furthermore, note that the one or more possible correct identifiers may be calculated based on the technique.

Then, the computer system selects at least one of the possible correct identifiers as the correct identifier (operation 118). In this way, the computer system may facilitate correction of errors in (and improving the accuracy of) the identifier, including those that can occur when the identifier is obtained from a noisy source (such as an image captured using a cellular telephone).

Note that at least some or all of the possible correct identifiers may have confidence values associated with them. Therefore, when selecting at least the one of the possible correct identifiers, the computer system may provide the multiple possible correct identifiers and the associated confidence values to the individual or a merchant. Then, the computer system may receive an instruction from the individual or the merchant identifying the correct identifier. Alternatively, when selecting at least the one of the possible correct identifiers, the computer system may: rank the multiple possible correct identifiers based on the associated confidence values; provide the ranked multiple possible correct identifiers to the individual or the merchant; and receive an instruction from the individual or the merchant identifying the correct identifier.

In some embodiments, the computer system optionally completes a financial transaction using the correct identifier (operation 120).

Furthermore, prior to the selecting (operation 118), the computer system may optionally test the possible correct identifiers to determine if any of the possible correct identifiers are valid identifiers (operation 116). In these embodiments, the selecting (operation 118) may be based on a result of the test.

Figure 2:
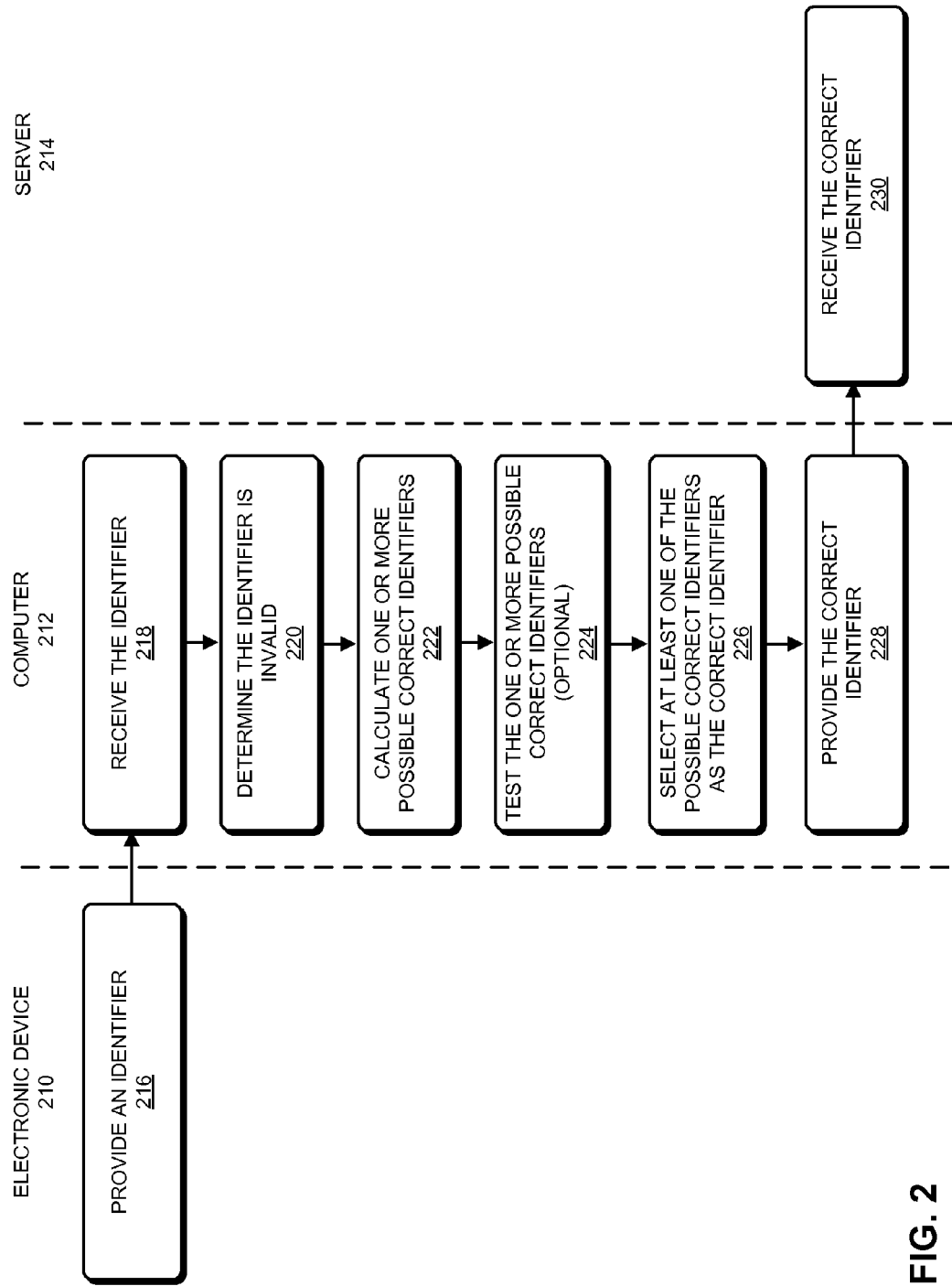
FIG. 2 is a flow chart illustrating the method of FIG. 1 in accordance with an embodiment of the present disclosure.

In an exemplary embodiment, the correction technique is implemented using an electronic device (such as a cellular telephone or a computer), a computer (such as a point-of-sale terminal or a magnetic card reader) and at least one server, which communicate through a network, such as a cellular-telephone network and/or the Internet (e.g., using a client-server architecture). This is illustrated in FIG. 2, which presents a flow chart illustrating method 100 (FIG. 1). During this method, a user (such as a consumer) of electronic device 210 may provide an identifier (operation 216) to a merchant that uses computer 212. For example, the user may take a picture or an image of a credit card or a debit card using an image sensor in a cellular telephone. Alternatively, the user may physically give a card (such as a credit card or a debit card) that includes the identifier to the merchant or may verbally state the identifier.

Then, computer 212 receives the identifier (operation 218). As noted previously, providing (operation 216) and/or receiving the identifier (operation 218) may involve one or more of a wide variety of 'sources' or acquisition techniques, including: an image sensor, a scanner, a natural-language processing technique (such as a dictation technique or a speech-to-text engine) that processes the user's or the merchant's spoken words, a card reader (such as an electronic card reader or a magnetic card reader), an optical-character-recognition engine that extracts the identifier from an image, a mechanical reader that measures and analyzes a roughness pattern on the surface of credit card or a debit card, and a keypad that the user or the merchant uses to type in the identifier.

After receiving the identifier (operation 218), computer 212 may determine the identifier is invalid (operation 220). In response, computer 212 may calculate one or more possible correct identifiers (operation 222) and associated confidence values based on the identifier and the source of the identifier. Furthermore, computer 212 may optionally test the one or more possible correct identifiers (operation 224) to determine if any of the possible correct identifiers are valid identifiers.

Next, computer 212 may select at least one of the possible correct identifiers (operation 226) as the correct identifier. For example, at least the one of the possible correct identifiers may be selected based on input from the user of electronic device 210, the merchant using computer 212 and/or the optional test (operation 224).

Furthermore, after selecting at least the one of the possible correct identifiers, computer 212 may provide (operation 228) and server 214 may receive the correct identifier (operation 230), which computer 212 and/or server 214 may use to complete a financial transaction (and, more generally, a transaction, which may not be financial).

In some embodiments of method 100 (FIGS. 1 and 2), there may be additional or fewer operations. Moreover, the order of the operations may be changed, and/or two or more operations may be combined into a single operation.

In an exemplary embodiment, the correction technique is used to correct invalid identifiers. In the discussion that follows, a credit-card number is used as an illustrative example of an identifier. Credit-card numbers have 16 digits. However, not all 16-digit numerical sequences are valid (as can be determined using a checksum). In the correction technique, a technique used to generate valid credit-card numbers may be used to identify an invalid identifier, and to generate a list of candidates for possible correct identifiers, along with associated confidence values (e.g., the probability that a given candidate is correct). Alternatively, an optical-character-recognition engine may provide the confidence values (for example, the probability that a '3' is an '8' or vice versa). Thus, in general, the list of candidates may also be based on the source of the identifier.

If a candidate is tested using the technique and passes, it is valid. This candidate may be presented to the user (such as a consumer) so that they can confirm it or it may be used without user feedback to complete a transaction. Alternatively, the list of candidates may be presented to the user with the confidence values listed either explicitly or implicitly (such as when the candidates are ranked based on the confidence values) and the user may select the correct identifier.

In the correction technique, a list of credit-card (or debit-card) numbers and associated confidence values (or accuracy estimates) may be calculated based on a source (such as optical character recognition or image character recognition performed on an image).

The numbers (or identifiers) in the list may be tested in order of accuracy to see if they are valid. For example, a checksum for each number may be determined using a Luhn formula. Any invalid numbers may be discarded from the list. However, if a number is found to be valid, it may be returned by the correction technique as the selected correct identifier and further analysis of the remaining numbers (i.e., possible correct identifiers) may be stopped.

As noted previously, the identifiers may be obtained from a wide variety of sources, including: an optical-character-recognition engine that performs optical character recognition on an image of an identifier card (for example, an image obtained using a cellular telephone, a digital camera or a scanner); a speech-to-text engine analyzing an audio stream (such as a user speaking numbers into an application on a cellular telephone); a card swiper; and a mechanical reader of the raised surface or roughness of an identifier card.

In an exemplary embodiment, a single number in an identifier is provided by a source (with or without an accuracy estimate), and the correction technique is used to generate the list of candidates and accuracy estimates. For example, the correction technique may determine an accuracy estimate of optical-character-recognition information based on the error between a '3' and an '8' 25% of the time.

In an exemplary embodiment, Joe is selling baseball cards at a collectables convention. He uses an application on his cellular telephone to obtain credit-card numbers from his customers. This version of the application allows him to simply take a picture of a credit card rather than swipe the credit card through a magnetic card reader.

However, optically reading credit-card numbers is an imperfect art. The optical-character-recognition engine used in the application may not guarantee that it reads a credit card correctly. Nonetheless, it may return several possible card numbers that it thinks might match the credit-card number. Each of these credit-card numbers may have an associated confidence value. In this case, the top three candidates may be: '1234567390123456' with an 87% confidence; '1234567890123456' with an 84% confidence; '1234557390123456' with a 48% confidence; and '1234557890123456' with a 43% confidence.

Rather than just use the most likely value ('1234567390123456') for the payment, the application may first calculate the checksums on the most likely candidates to confirm that they are valid credit-card numbers. The application may determine that: '1234567390123456' is invalid; '1234567890123456' is valid; '1234557390123456' is invalid; and '1234557890123456' is valid.

As a consequence, the application may determine that the second candidate ('1234567890123456') is the most likely candidate that is a valid credit-card number. The application may display this number so that Joe can verify that it is correct. After Joe verifies that the credit-card number is correct, the application may initiate the transaction.

Figure 3:
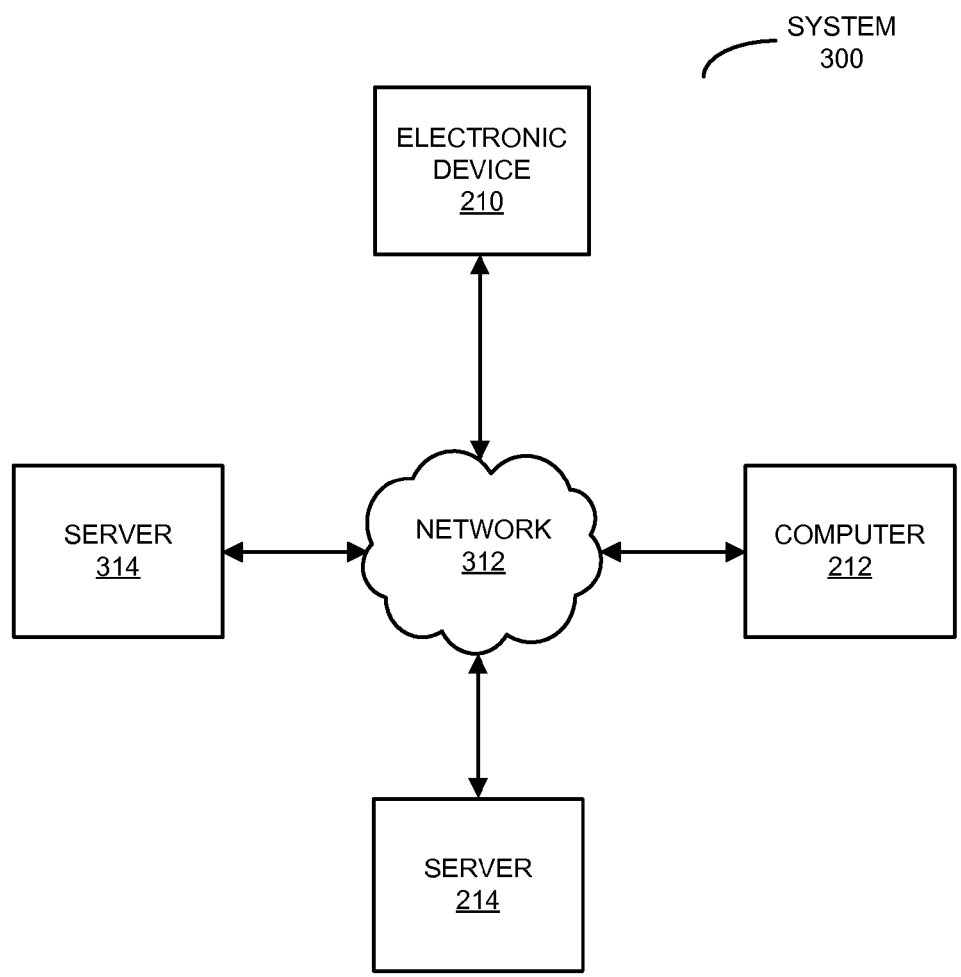
FIG. 3 is a block diagram illustrating a system that performs the method of FIGS. 1 and 2 in accordance with an embodiment of the present disclosure.

We now describe embodiments of the system and the computer system, and their use. FIG. 3 presents a block diagram illustrating a system 300 that performs method 100 (FIGS. 1 and 2). In this system, a user of electronic device 210 may use a software product, such as a financial software application that is resident on and that executes on electronic device 210. (Alternatively, the user may interact with a web page that is provided by server 314 via network 312, and which is rendered by a web browser on electronic device 210. For example, at least a portion of the financial software application may be an application tool that is embedded in the web page, and which executes in a virtual environment of the web browser. Thus, the application tool may be provided to the consumer via a client-server architecture.) This financial software application may be a standalone application or a portion of another application that is resident on and which executes on electronic device 210 (such as a software application that is provided by server 314 or that is installed and which executes on electronic device 210).

As discussed previously, the user of electronic device 210 may provide an identifier to a merchant that uses computer 212 via network 312. For example, using the software product the user may take a picture of a credit card or a debit card (including the credit-card number or the debit-card number) and may communicate this image to computer 212.

After receiving the identifier (which may involve scanning the image and performing optical character recognition), another software product (which may be the same or different from the one executing on electronic device 210) that is resident on and that executes on computer 212 may be used to determine if the identifier is invalid. Note that the other software product executing on computer 212 may be: a web page that is provided by server 314 via network 312, a standalone application, or a portion of another application that is resident on and which executes on computer 212. This other software application may be a financial software application.

In response, the other software application executing on computer 212 may calculate one or more possible correct identifiers and associated confidence values based on the identifier and a source of the identifier (which may also be communicated to computer 212 by electronic device 210 or which may be inherent to a format of the identifier). Furthermore, the other software application executing on computer 212 may optionally test the one or more possible correct identifiers to determine if any of the possible correct identifiers are valid identifiers.

Next, the other software application executing on computer 212 may select at least one of the possible correct identifiers as the correct identifier. For example, at least the one of the possible correct identifiers may be selected based on input from the user of electronic device 210 (which is received via network 312), the merchant using computer 212 and/or the optional test.

Furthermore, after selecting at least the one of the possible correct identifiers, the other software application executing on computer 212 may provide the correct identifier to server 214 using network 312. Server 214 may use the correct identifier to complete a financial transaction (and, more generally, a transaction, which may not be financial).

Note that information in system 300 may be stored at one or more locations in system 300 (i.e., locally or remotely). Moreover, because this data may be sensitive in nature, it may be encrypted. For example, stored data and/or data communicated via network 312 may be encrypted.

Figure 4:
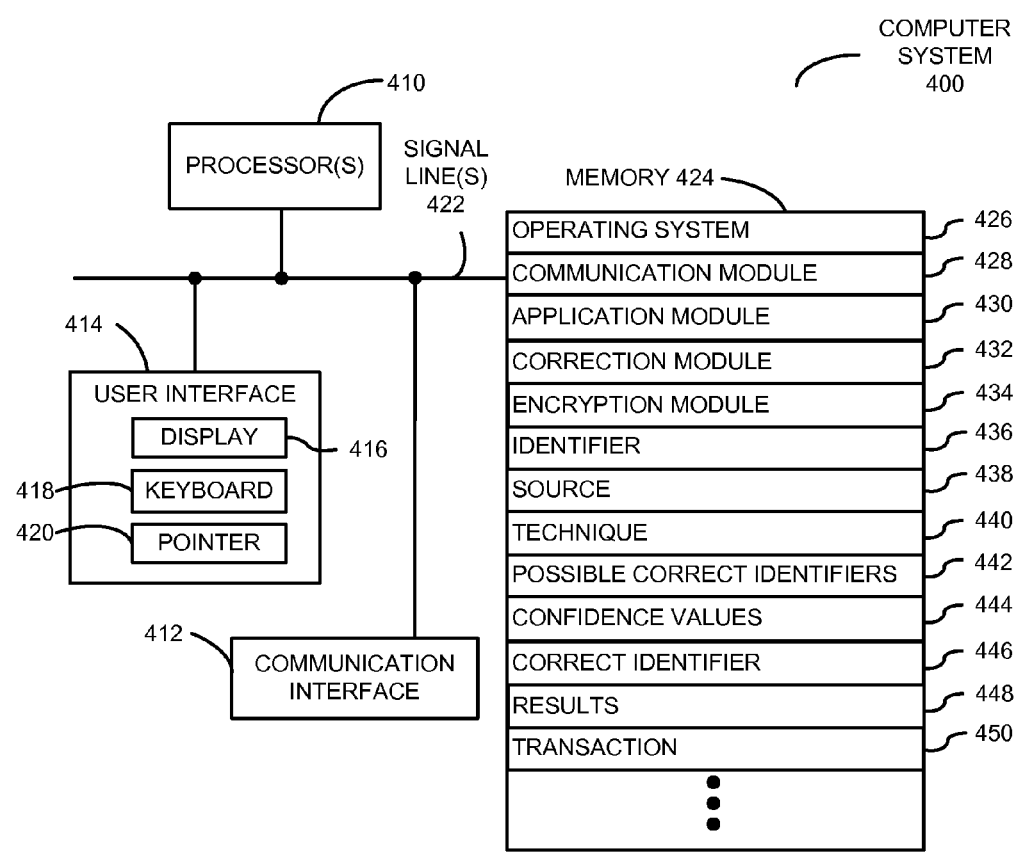
FIG. 4 is a block diagram illustrating a computer system that performs the method of FIGS. 1 and 2 in accordance with an embodiment of the present disclosure.

FIG. 4 presents a block diagram illustrating a computer system 400 that performs method 100 (FIGS. 1 and 2), such as computer 212 (FIGS. 2 and 3). Computer system 400 includes one or more processing units or processors 410, a communication interface 412, a user interface 414, and one or more signal lines 422 coupling these components together. Note that the one or more processors 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in computer system 400 may include volatile memory and/or non-volatile memory. More specifically, memory 424 may include: ROM, RAM, EPROM, EEPROM, flash memory, one or more smart cards, one or more magnetic disc storage devices, and/or one or more optical storage devices. Memory 424 may store an operating system 426 that includes procedures (or a set of instructions) for handling various basic system services for performing hardware-dependent tasks. Memory 424 may also store procedures (or a set of instructions) in a communication module 428. These communication procedures may be used for communicating with one or more computers and/or servers, including computers and/or servers that are remotely located with respect to computer system 400.

Memory 424 may also include multiple program modules (or sets of instructions), including: application module 430 (or a set of instructions), correction module 432 (or a set of instructions) and/or encryption module 434 (or a set of instructions). Note that one or more of these program modules (or sets of instructions) may constitute a computer-program mechanism.

During method 100 (FIGS. 1 and 2), application module 430 may receive an identifier 436 for an individual from a source 438. Then, correction module 432 may determine that identifier 436 is an invalid identifier based on a technique 440 used to generate identifiers for individuals.

Moreover, correction module 432 may calculate one or more possible correct identifiers 442 and associated confidence values 444 based on identifier 436 and/or source 438. The results of these calculations may be included in a data structure. This is shown in FIG. 5, which presents a data structure 500 that includes candidates 510. In particular, candidates 510-1 may include: identifier 512-1, source 514-1, technique 516-1, possible correct identifiers 518-1, confidence values 520-1, and/or an optional ranking 522-1 of possible correct identifiers 518-1.

Referring back to FIG. 4, correction module 432 may select at least one of possible correct identifiers 442 as a correct identifier 446. This selection may be based on results 448 of testing of possible correct identifiers 442 by correction module 432 to determine if any of possible correct identifiers 442 are valid identifiers. Furthermore, application module 430 may use correct identifier 446 to complete a transaction 450, such as a financial transaction.

Because information in computer system 400 may be sensitive in nature, in some embodiments at least some of the data stored in memory 424 and/or at least some of the data communicated using communication module 428 is encrypted using encryption module 432.

Instructions in the various modules in memory 424 may be implemented in: a high-level procedural language, an object-oriented programming language, and/or in an assembly or machine language. Note that the programming language may be compiled or interpreted, e.g., configurable or configured, to be executed by the one or more processors 410.

Although computer system 400 is illustrated as having a number of discrete items, FIG. 4 is intended to be a functional description of the various features that may be present in computer system 400 rather than a structural schematic of the embodiments described herein. In practice, and as recognized by those of ordinary skill in the art, the functions of computer system 400 may be distributed over a large number of servers or computers, with various groups of the servers or computers performing particular subsets of the functions. In some embodiments, some or all of the functionality of computer system 400 may be implemented in one or more application-specific integrated circuits (ASICs) and/or one or more digital signal processors (DSPs).

In some embodiments one or more of the modules in memory 524 (such as application module 430) may be associated with and/or included in a financial application. This financial application may include: Quicken™, Mint™, GoPayment™, Intuit Payment Network™ and/or TurboTax™ (from Intuit, Inc., of Mountain View, Calif.), a Visa™ card payment system (from Visa Inc. of San Francisco, Calif.), a Mastercard™ payment system (from Mastercard Inc., of Purchase, N.Y.), an AmEX™ payment system (from the American Express Company, of New York City, N.Y.), PayaI™ (from eBay Inc., of San Jose, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, the financial application may be associated with and/or include software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), Tally.ERP (from Tally Solutions, Ltd., of Bangalore, India) and/or other payroll or accounting software capable of processing payroll information.

Computer systems (such as computer system 400), as well as computers and servers in system 300 (FIG. 3) may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a server and/or a client computer (in a client-server architecture). Moreover, network 312 (FIG. 3) may include: the Internet, World Wide Web (WWW), an intranet, a cellular-telephone network, LAN, WAN, MAN, or a combination of networks, or other technology enabling communication between computing systems.

System 300 (FIG. 3) and/or computer system 400 may include fewer components or additional components. Moreover, two or more components may be combined into a single component, and/or a position of one or more components may be changed. In some embodiments, the functionality of system 300 (FIG. 3) and/or computer system 400 may be implemented more in hardware and less in software, or less in hardware and more in software, as is known in the art.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for determining a correct identifier for an individual, comprising:
   receiving an image of an identifier for the individual from a source;
   performing, by using a computer, optical-character-recognition on the image to determine a set of possible correct identifiers and associated confidence values;
   determining a subset of possible correct identifiers from the set of possible correct identifiers by computing a checksum for each of the possible correct identifiers and discarding possible correct identifiers whose identifier is incorrect based on the checksum; and
   selecting a possible correct identifier that has the highest confidence value from the subset of possible correct identifiers as the correct identifier.

2. The method of claim 1, wherein at least some of the possible correct identifiers have associated confidence values.

3. The method of claim 2, wherein the method further comprises:
   providing the multiple possible correct identifiers and the associated confidence values to the individual; and
   receiving an instruction from the individual identifying the correct identifier.

4. The method of claim 2, wherein the method further comprises:
   ranking the multiple possible correct identifiers based on the associated confidence values;
   providing the ranked multiple possible correct identifiers to the individual; and
   receiving an instruction from the individual identifying the correct identifier.

5. The method of claim 1, wherein the method further comprises completing a financial transaction using the correct identifier.

6. The method of claim 1, wherein, prior to the selecting, the method further comprises testing the possible correct identifiers to determine if any of the possible correct identifiers are valid identifiers.

7. The method of claim 1, wherein the identifier includes one of: a credit-card number, a debit-card number, a national identification-card number, a national provider identifier number, and a Social Security number.

8. The method of claim 1, wherein the source includes at least one of: an image sensor, a scanner, a natural-language processing technique, a card reader, an optical-character-recognition engine, a mechanical reader, and a keypad.

9. The method of claim 1, wherein the method facilitates correction of errors in the identifier.

10. The method of claim 1, wherein the technique produces a checksum.

11. The method of claim 1, wherein the one or more possible correct identifiers are calculated based on the technique.

12. A computer-program product for use in conjunction with a computer system, the computer-program product comprising a non-transitory computer-readable storage medium and a computer-program mechanism embedded therein, to facilitate determining a correct identifier for an individual, the computer-program mechanism including:
   instructions for receiving an image of an identifier for the individual from a source;
   instructions for performing, by using a computer, optical-character-recognition on the image to determine a set of possible correct identifiers and associated confidence values;
   instructions for determining a subset of possible correct identifiers from the set of possible correct identifiers by computing a checksum for each of the possible correct identifiers and discarding possible correct identifiers whose identifier is incorrect based on the checksum; and
   instructions for selecting a possible correct identifier that has the highest confidence value from the subset of possible correct identifiers as the correct identifier.

13. The computer-program product of claim 12, wherein at least some of the possible correct identifiers have associated confidence values.

14. The computer-program product of claim 13, wherein the computer-program mechanism further comprises:
   instructions for providing the multiple possible correct identifiers and the associated confidence values to the individual; and
   instructions for receiving an instruction from the individual identifying the correct identifier.

15. The computer-program product of claim 13, wherein the computer-program mechanism further comprises:
   instructions for ranking the multiple possible correct identifiers based on the associated confidence values;
   instructions for providing the ranked multiple possible correct identifiers to the individual; and
   instructions for receiving an instruction from the individual identifying the correct identifier.

16. The computer-program product of claim 12, wherein the computer-program mechanism further comprises instructions for completing a financial transaction using the correct identifier.

17. The computer-program product of claim 12, wherein, prior to the selecting, the method further comprises testing the possible correct identifiers to determine if any of the possible correct identifiers are valid identifiers.

18. The computer-program product of claim 12, wherein the identifier includes one of: a credit-card number, a debit-card number, a national identification-card number, a national provider identifier number, and a Social Security number.

19. The computer-program product of claim 12, wherein the source includes at least one of: an image sensor, a scanner, a natural-language processing technique, a card reader, an optical-character-recognition engine, a mechanical reader, and a keypad.

20. The computer-program product of claim 12, wherein the computer-program mechanism facilitates correction of errors in the identifier.

21. The computer-program product of claim 12, wherein the technique produces a checksum.

22. A computer system, comprising:
   a processor;
   memory; and
   a program module, wherein the program module is stored in the memory and configurable to be executed by the processor to facilitate determining a correct identifier for an individual, the program module including:
      instructions for receiving an image of an identifier for the individual from a source;

instructions for performing, by using a computer, optical-character-recognition on the image to determine a set of possible correct identifiers and associated confidence values;

instructions for determining a subset of possible correct identifiers from the set of possible correct identifiers by computing a checksum for each of the possible correct identifiers and discarding possible correct identifiers whose identifier is incorrect based on the checksum; and instructions for selecting a possible correct identifier that has the highest confidence value from the subset of possible correct identifiers as the correct identifier.

* * * * *